(12) United States Patent
Guenther et al.

(10) Patent No.: US 7,146,323 B2
(45) Date of Patent: Dec. 5, 2006

(54) METHOD AND SYSTEM FOR GATHERING INFORMATION BY VOICE INPUT

(75) Inventors: Carsten Guenther, Bammental (DE); Walter Haenel, Holzgerlingen (DE); Thomas Schaeck, Achern (DE)

(73) Assignee: International Business Machines Corporation, Armonk, NY (US)

(*) Notice: Subject to any disclaimer, the term of this patent is extended or adjusted under 35 U.S.C. 154(b) by 849 days.

(21) Appl. No.: 10/003,791

(22) Filed: Nov. 15, 2001

(65) Prior Publication Data

US 2002/0062216 A1   May 23, 2002

(30) Foreign Application Priority Data

Nov. 23, 2000   (EP)   .................................   00125606

(51) Int. Cl.
    G10L 21/06   (2006.01)
(52) U.S. Cl. .................................................... 704/275
(58) Field of Classification Search ............... 704/275, 704/270.1
    See application file for complete search history.

(56) References Cited

U.S. PATENT DOCUMENTS

| | | | | |
|---|---|---|---|---|
| 5,884,266 | A | | 3/1999 | Dvorak ........................ 704/275 |
| 5,960,399 | A | * | 9/1999 | Barclay et al. .............. 704/275 |
| 6,029,135 | A | | 2/2000 | Krasle ......................... 704/275 |
| 6,188,985 | B1 | * | 2/2001 | Thrift et al. ................. 704/275 |
| 6,424,945 | B1 | * | 7/2002 | Sorsa ....................... 704/270.1 |
| 6,539,359 | B1 | * | 3/2003 | Ladd et al. .................. 704/275 |
| 6,587,822 | B1 | * | 7/2003 | Brown et al. ................ 704/275 |
| 6,604,075 | B1 | * | 8/2003 | Brown et al. ............. 704/270.1 |
| 6,636,831 | B1 | * | 10/2003 | Profit et al. .................. 704/275 |
| 6,882,974 | B1 | * | 4/2005 | James et al. .............. 704/270.1 |
| 6,934,756 | B1 | * | 8/2005 | Maes ........................... 709/227 |
| 7,020,841 | B1 | * | 3/2006 | Dantzig et al. ............. 715/727 |

FOREIGN PATENT DOCUMENTS

| WO | WO 99/48088 | 9/1999 |
|---|---|---|
| WO | WO 01/95087 | 12/2001 |

OTHER PUBLICATIONS

Borges et al., "Speech Browsing the World Wide Web," IEEE SMC '99 Conference Proceedings,□□vol. 4, Oct. 12-15, 1999 pp. 80-86 vol. 4 □□.*
K. Kondo, et al., *Surfin' The World Wide Web With Japanese*, Texas Instruments Personal Systems Laboratory, *Acoustics, Speech, and Signal Processing*, 1997 IEEE Int'l. Conf., pp. 1151-1154, (Apr. 21, 1997).

* cited by examiner

*Primary Examiner*—Susan McFadden
(74) *Attorney, Agent, or Firm*—Akerman Senterfitt

(57) ABSTRACT

The present invention allows users to navigate in a Web application or Web pages using a combination of point-and-click and voice-input. At each point of the dialog, the user can use the standard point-and-click interface to perform context-dependent actions, or alternatively, use speech input to navigate and operate in the global application context. The voice input uses a voice navigation component which builds an interface to the installed recognition and synthesis engines. The point-and-click and the voice navigation components can be loaded automatically with the initial Web page of a Web application. Grammars for recognizing vocabulary related to that Web application will be provided with the voice navigation component. The present invention combines the advantages of a context-dependent point-and-click user interface with those of a context-independent speech-input interface. Accordingly, a multi-modal interface can be provided to a Web browser.

29 Claims, 4 Drawing Sheets

METHOD AND SYSTEM FOR GATHERING INFORMATION BY VOICE INPUT

CROSS-REFERENCE TO RELATED APPLICATIONS

This application claims the benefit of European Application No. 00125606.4, filed Nov. 23, 2000 at the European Patent Office.

BACKGROUND OF THE INVENTION

1. Technical Field

The present invention relates generally to speech recognition, and more particularly, to a voice-driven method and system for gathering information accessible via a network.

2. Description of the Related Art

Hypertext systems are rapidly increasing in significance in many areas of data and communications technology. Important examples which have already been realized include typical hypertext help systems and hypertext documentation for software applications as are commonly used with graphical operating systems for personal computers. To use these systems, a user typically navigates within single hypertext documents which are stored as data files on a single computer. Another example of a hypertext system is the World Wide Web (WWW), a worldwide hypertext network based on the Internet wherein users can navigate through a plurality of hypertext documents which are linked, cite, or reference one another. These hypertext documents are generally stored on a great number of computers in the network which are often located great distances from one another. Hypertext documents generally contain information in the form of text, digital images, audio and video data, and/or combinations thereof.

A significant characteristic feature of all hypertext systems is the possibility of navigation. In addition to containing the actual text of the document, a hypertext document contains special character sequences that can also be a component part of the actual text. These special character sequences are usually referred to as links or hyper-links and serve the purpose of hypertext navigation. Typically, these character sequences are specially marked. For example, hyperlinks can be displayed in a different color or can be emphasized in some other way, to distinguish the special character sequences from the ordinary text of the document. When a user of a hypertext system selects such a link, usually with a short click with the mouse or other pointing device, the hypertext system can react to this instruction by displaying, for example, the part of the same hypertext document or a different hypertext document which is associated with the character sequence (or link). Other possible reactions to selection of a link can include opening a connection to a different computer, for example to an on-line data bank, starting another application program, opening another data file, initiating a data processing process, or any combination thereof.

Hypertext systems also can execute other instructions which are not associated with the character sequences (links) in the hypertext documents. These instructions can include, for example, paging through documents or portions of documents which already have been displayed (for example, pages of the document), storing hypertext pages in what are referred to as hot lists, retrieving or paging through pages stored in hot lists, reloading images, and the like. Typically, these instructions are input in a manner commonly associated with graphic user interfaces, for example with a mouse or other pointing device.

There are a number of possible applications of hypertext-based systems wherein the traditional manner of inputting instructions or of activating links is considered to be disturbing, undesirable, or even impossible. Such can be the case when the user is impeded, the user's hands are busy with managing other jobs, or when the ambient conditions forbid the employment of traditional input devices. Voice recognition is available in such cases as a simple, natural type of input that assumes less expertise on the part of the user than other input means. The integration of traditional, acoustic voice recognition systems, i.e. systems for recognizing spoken language, with hypertext systems, which are also known as "viewer" or "browser" systems, are opposed by technological difficulties. For example, the voice recognition system must be able to recognize every word that can occur as a link in a hypertext document. Because practically every word in the text can also be a hyper-link, extremely large dictionaries would be required for this purpose. These large dictionaries would reduce the processing speed and the recognition performance of such a speech recognition system to an unjustifiable extent. Even if the employment of extremely large dictionaries were possible, recently coined or new words, as well as proper names may not be recognized. The use of new words and proper names, however, is typical with respect to many hypertext applications, particularly with hypertext networks such as the World Wide Web.

U.S. Pat. No. 6,029,135 discloses a hypertext navigation system for voice controlled navigation wherein a dictionary is provided which includes probability models for spoken words. The dictionary and probability model, which can include phoneme sequences to be matched to the spoken words is generated in the user's system during access to the hypertext document in the run time version. An off-line version provides a dictionary and a probability model that is generated, for example, by the author of the hypertext document. The model is stored on the server and is forwarded to the user system when the document is accessed by the user. The dictionary and probability model corresponds to the hypertext elements that are in the hypertext document which is being accessed by the user. Accordingly, the dictionary and probability model are discarded and the next dictionary and probability model are obtained as the next hypertext document is accessed. Storage of recent or important dictionaries and probability models are also provided.

One disadvantage of the above-mentioned system is that the voice recognition is mainly restricted to the hyperlinks used in the hypertext document being accessed by the user. Other hyperlinks which are not visible on the hypertext document being accessed cannot be recognized. Furthermore, such prior art systems cannot accommodate forms which can be filled out by a user.

It is therefore object of the present invention to provide a hypertext navigation system combining the advantages of point and click hypertext navigation system with prior art voice controlled hypertext navigation system by avoiding their disadvantages.

SUMMARY OF THE INVENTION

The present invention discloses a method and system for gathering information by voice input, especially a method and system for context-independent navigation in Web applications or related Web pages using voice input. The present invention allows users to navigate in a Web application or Web pages using a combination of point-and-click interaction, voice-input, and voice-output interaction. At each point of the dialog, the user can use the standard point-and-click interface to perform context-dependent actions, or alternatively, use speech input to navigate and operate in the global application context.

The voice input uses a voice navigation component which builds an interface to the installed recognition and synthesis engines. The point-and-click and the voice navigation components can be loaded automatically with the initial Web page of a Web application. Grammars or language models for recognizing vocabulary related to that Web application can be provided with the voice navigation component. The present invention combines the advantages of a context-dependent point-and-click user interface with those of a context-independent speech-input interface. This approach can enhance Web browsers by providing multi-modal interfaces.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

Figure 1:
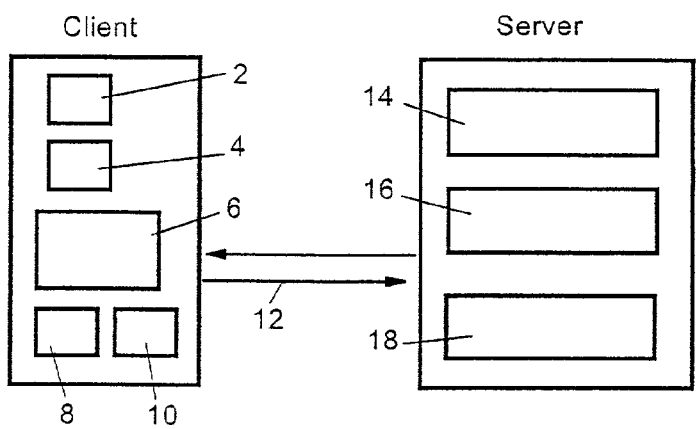
FIG. 1 is a schematic diagram illustrating an exemplary architecture which preferably can be used with the inventive arrangements disclosed herein.

FIG. 1 illustrates a basic architecture in which the present invention preferably can be implemented. The basic architecture can be a client-server architecture. On the client side, the following standard components can be installed: an audio output device (2) such as a loud speaker or head phones; a microphone (4); a Web browser (6) (e.g. Netscape); a speech recognition (8) and a speech synthesis system (10) (e.g. IBM Via Voice and IBM Via Voice Outloud respectively).

The heart of the speech recognition system is known as a speech recognition engine. The speech recognition engine recognizes speech input and translates it into text that an application understands. The application then can decide what to do with the recognized text. Speech-aware applications (18) access the speech engine and various speech resources through a speech recognition API (Application Programming Interface).

The speech recognition engine can use the following resources to process spoken words: the user's language of origin and grammars. Notably, the language of origin is the language used by the speaker. Each language can include several different grammars. A grammar is a set of vocabularies, pronunciations, and word usage models designed to support the application. The grammar can be used by the speech engine to decode speech for the application. The application can specify the set of active words by activating one or more grammars.

On the server side, the following standard components preferably are installed: a Web server or HTTP-Server (14); one or more Web applications or servlets (18); and an application server and/or a data base (16).

Figure 2:
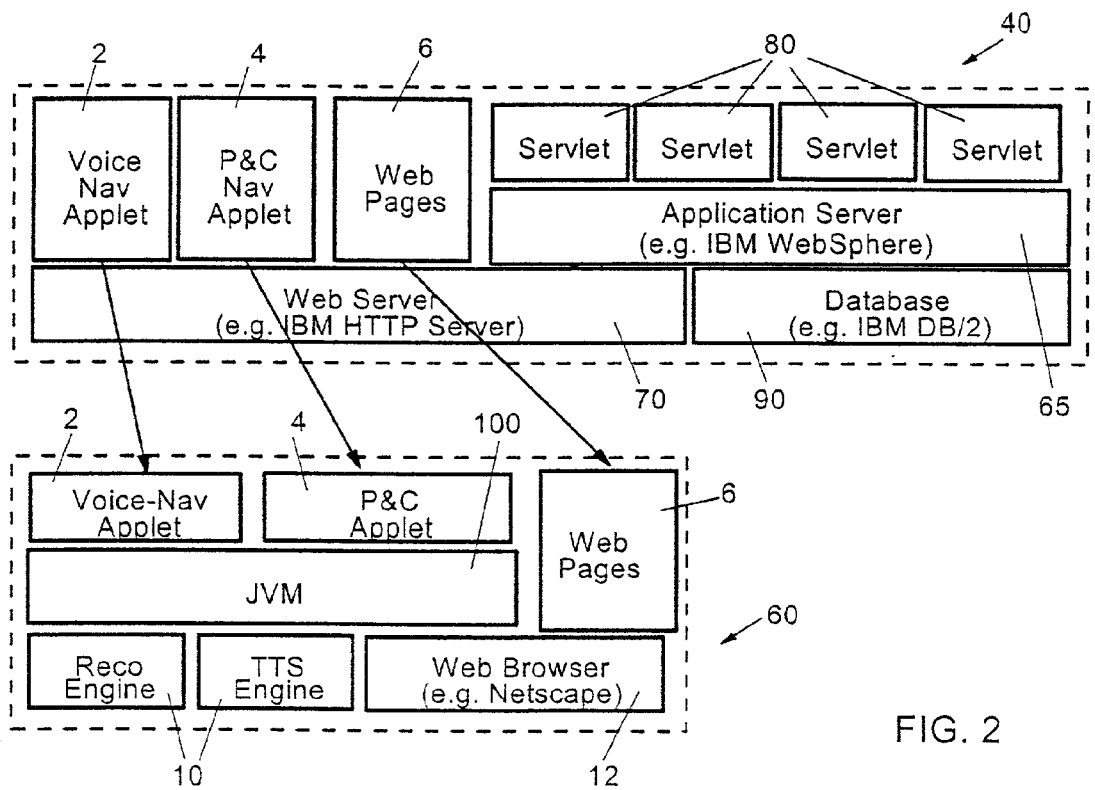
FIG. 2 is a schematic diagram illustrating a preferred embodiment of the present invention which can be used with the exemplary architecture of FIG. 1.

FIG. 2 illustrates an exemplary implementation of the present invention in a client-server architecture as shown in FIG. 1. The speech recognition and synthesis systems are available to signed Java applets. The main component of the present invention is the voice navigation component (applet). The voice navigation component (applet) (2) performs the following major steps:

locates, selects, and initializes a speech recognition engine and a speech synthesis engine;

defines, enables, and disables decoding grammars; and processes the recognition results (e.g. launches HTTP requests, initiates spoken words, and plays back of prerecorded prompt).

It is possible to use general grammars or language models that are available at the client side (60). Usually such grammars can be installed along with the general speech recognition engine (10). Furthermore it is required to upload application-dependent, or so called information-dependent, grammars from the server to the client (60). These grammars specify the recognition vocabulary for navigating within related Web pages, Web pages belonging to a Web application, or related Web applications. The point-and click navigation component (applet 4) presents visible and activable menu items or fillable fields. The point-and-click method is often user unfriendly and can require the use of highly structured user interfaces to Web applications (servlets 80) which further requires many clicks to step down through a menu structure, or to switch into a new menu context. Therefore, it can be more user friendly to use the more general inventive voice navigation component (applet) (2). The possible input values (spoken words) used to select links, menu items, or to fill out forms in a visible Web page or non-visible Web page can be defined via grammars. Therefore, it is not necessary to restrict valid input values to visible links. Additionally, out of context or more general links which can function as shortcuts to avoid time consuming menu navigation can be speech enabled.

A further component of the present is the conventional point-and-click navigation component (applet 4) as used in existing prior art systems (mouse systems). The point-and-click component (applet PACNA) can load new Web pages responsive to a user selection (pointing and clicking) of a hyperlink displayed in an HTML document. Both components 2 and 4 are originally stored on the server system. Preferably, the loading of an initial Web page (6) from the server (40) in the client automatically can initiate a loading of both components. If the application dependent grammars are specified in separate applets or files on the server (40), the application dependent grammars can be loaded in conjunction with the initial Web page (6) which can contain links (reference information/URLs) to the respective application grammar. In another embodiment, the grammars can be part of the voice navigation component (applet).

The point-and-click navigation component (applet 4) and the voice navigation component (applet) (2) process the respective user input to produce an HTTP-request required to load a new Web page. The user can select between both components 2 and 4 alternatively by clicking the appropriate applet symbol displayed in the GUI on the client display, preferably provided by the Web-application (servlet).

Further standard components on the sewer side can include a Web server (e.g. IBM HTTP-server; 70), an Application Server (e.g. IBM Websphere; 65), and a database (e.g. IBM DB/2; 90). The Web server (70) and the Web browser (e.g. Netscape; 12) can communicate with each other. The servlets (80) and applets (2, 4) can be stored on the sewer (40). The servlets (80) can be executed on the server side; and, the applets (2, 4) can be executed on the client side. On the client side a Java Virtual Machine (100) must be available for processing the Java-applets.

Figure 3:
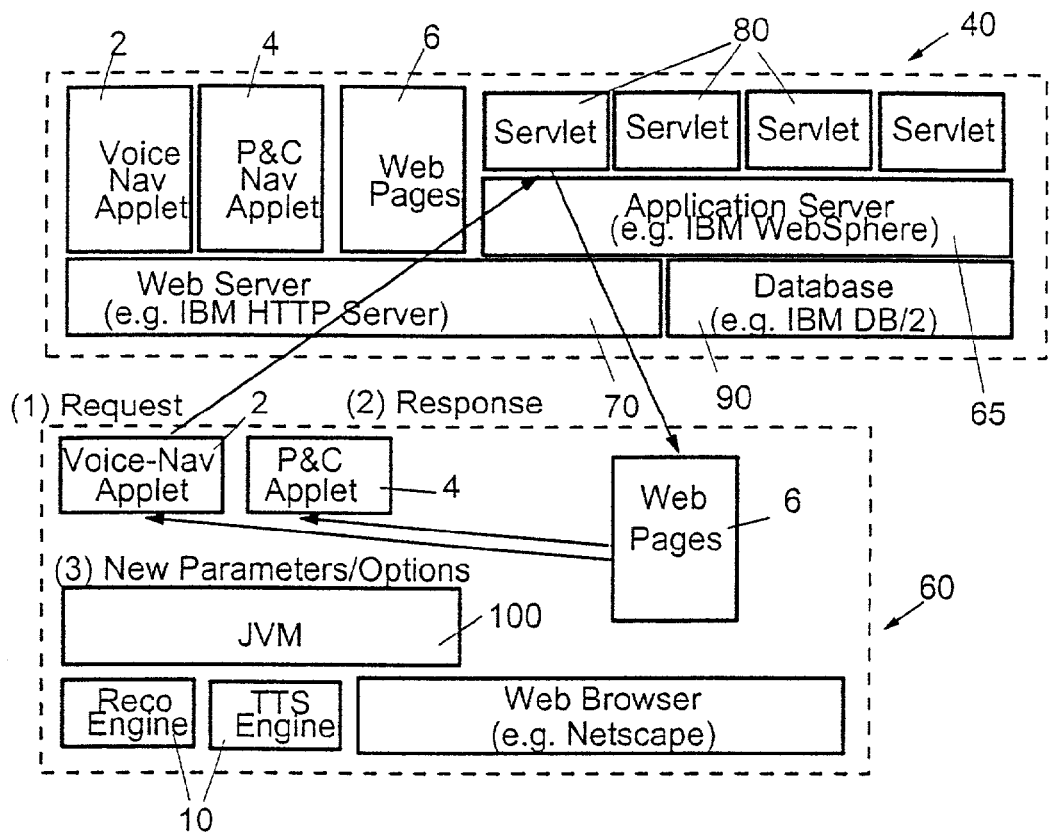
FIG. 3 is a schematic diagram illustrating an exemplary embodiment of a voice navigation component in accordance with the inventive arrangements disclosed herein.

FIG. 3 illustrates the basic structure of the voice navigation component (applet) according to FIG. 2. The voice navigation component (applet 2), which has been loaded from the server (40) in the client (60), uses the client voice recognition system (10) via the JVM (100). The voice navigation component can connect to the installed recognition and synthesis systems. The grammars or language models for the Web-applications to be accessed (servlets 80) can be enabled or loaded, and prompts can be played. The voice navigation component (applet 2) passes audio input to the speech recognition engine (10) to decode against enabled grammars. The recognition result can contain recognized words/phrases and grammar annotations. The voice navigation component (applet 2) can specify the processing of the recognition result. Relevant information of the result is extracted and is sent to the server (40), e.g. to a servlet. The server (40) can further process the request, and as a result for example, can return a response with a new Web page (6). Possible reactions can include changing the browser content, launching an HTTP request to load new Web page, retrieve information from the server, and to initiate a server-based transaction. The processing of the recognition result can be done either in the client (60) or in the server (40). Alternatively, the processing can be distributed partly to the client (60) and the server (40). For example the semantic processing of the speech input can be distributed between client (60) and server (40). Another possible implementation can be that the initial signal processing can be accomplished by a signal processing applet on the client side. For example, the feature vector can be sent via the network to the server side, and the speech recognition can be performed on the server side.

Figure 4:
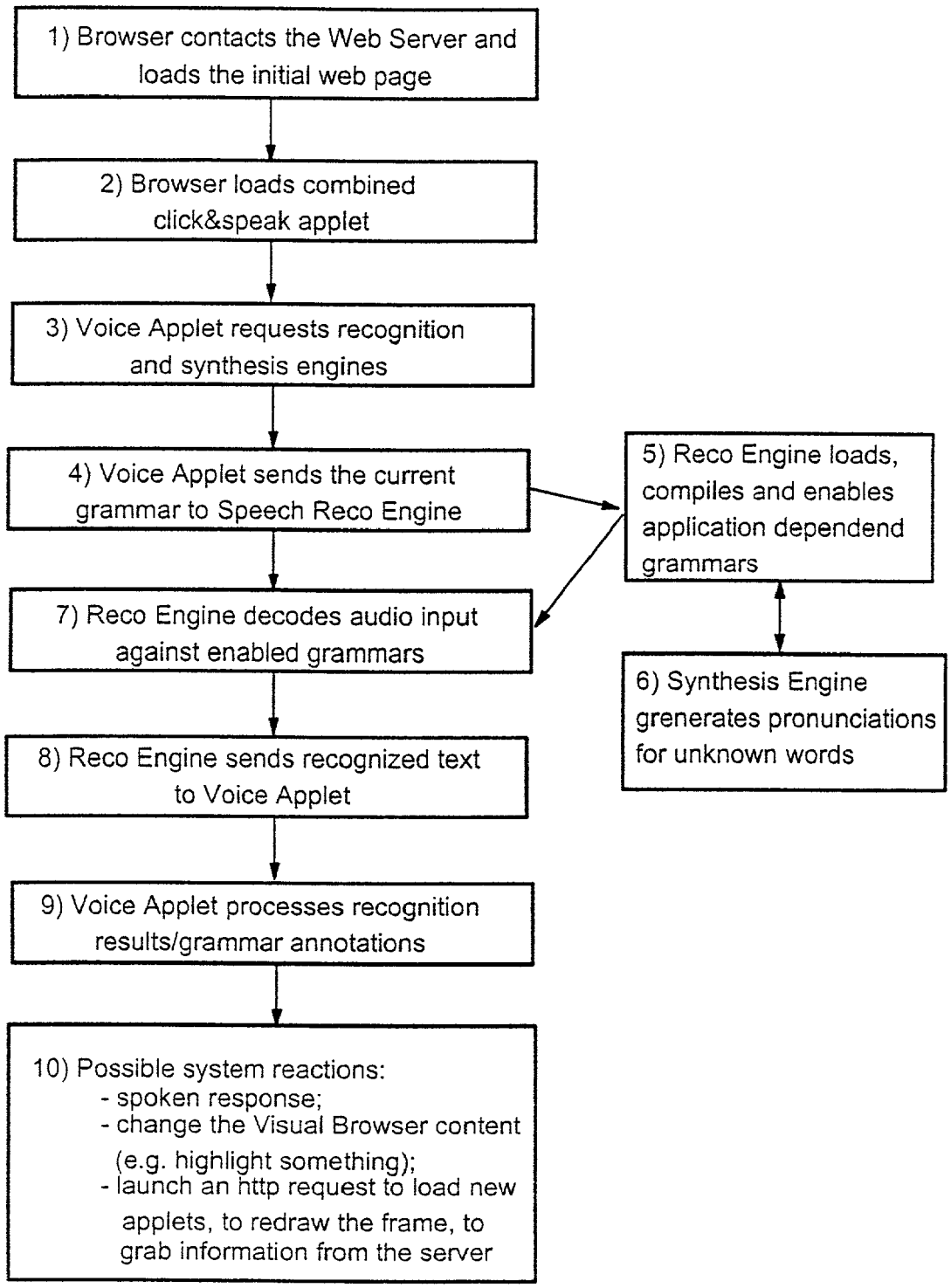
FIG. 4 is a flow chart illustrating an exemplary method of voice activated navigation in accordance with the inventive arrangements disclosed herein.

FIG. 4 is a flow chart illustrating an exemplary process of voice-activated navigation according to the present invention. As shown in FIG. 4, the method can include a series of steps.

1. The browser can contact the Web server and load an initial Web page (2).

2. The browser can load combined point-and-click and voice navigation components (applets). The initial Web page can include reference information/links (URLs) to the point-and-click and voice navigation component (applet). The browser can evaluate the URLs and load the respective components (applet) (4).

3. The voice navigation component (applet) can request recognition and synthesis engines. The Java Virtual Machine can process both components (applet). The voice navigation component (applet) can initialize the voice driven user interface. It can locate, select, and create a speech recognition engine and a speech synthesis engine. The speech recognition engine can be responsible for processing audio input to the browser, whereas the speech synthesis engine can create spoken words (6).

4. The voice component (applet) can send the current vocabulary to the speech recognition engine (8). The recognition of incoming speech is grammar driven. The valid grammar can be defined in applets which will be loaded with voice navigation component (applet). The grammar will contain words/phrases matching words/phrases visible in the browser window. Furthermore, the voice navigation component (applet) may activate additional words/phrases that do not match expressions in the browser window. The present invention can enable words/phrases from a broader context. For example, words and/or phrases for navigating within related Web pages, Web pages belonging to a Web application, or related Web applications such as general navigation commands, help commands, additional submenu items, and the like (information-dependent grammars) can be enabled. This allows direct voice driven jumps into an application submenu and can overcome the cumbersome approach of clicking through endless menu lists and check boxes.

5. The speech recognition engine can load, compile, and enable information/application-dependent grammars (10). The recognition engine can enable the defined grammars. Moreover, it is possible to enable multiple grammars for recognizing a broad scope of speech. Within the grammars, the valid recognition vocabulary is defined (10).

6. The synthesis engine can generate pronunciations for unknown words (12). A speech recognition engine can include a basic vocabulary and attached pronunciations. An application, however, can contain unknown words. The recognition engine can send a request to the synthesis engine to generate missing pronunciations. These words then can be added to the actual enabled words.

7. The speech recognition engine can decode audio input based upon enabled grammars (14). Incoming audio input can be routed to the speech recognition engine. The speech recognition engine then can decode audio against the enabled grammars.

8. The speech recognition engine can send recognized text to the voice navigation component (applet) (16). The recognition result can contain recognized words/phrases and grammar annotations. Grammar annotations represent return values of recognized grammar phrases and allow a flexible processing of recognition results. Misrecognitions also (e.g. incomplete phrases, low audio input level) have to be handled by the voice navigation component (applet).

9. The voice navigation component (applet) specifies the processing of the recognition result (18).

10. The possible reactions can include:
   a spoken response;
   a change of the browser content; or
   launching an HTTP request to load a new application/applet or Web page, to redraw the content frame, to retrieve information from a server, or to initiate a server-based transaction (20).

Figure 5:
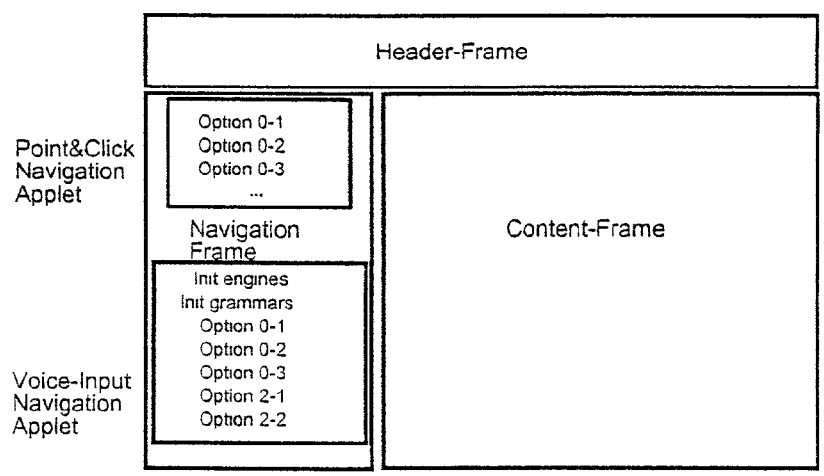
FIG. 5 illustrates a preferred embodiment of a user interface for activating the point-and-click and voice navigation components in accordance with the inventive arrangements disclosed herein.

FIG. 5 illustrates an example of a user interface for the point-and-click navigation component (applet) and the voice navigation component (applet) preferably used in the present invention. The user interface of the voice navigation component (applet) can provide several options (6) for enabling or activating different grammars. For example, option 0-3 can activate grammars which are restricted to recognizing only visible links. Option 2-2 can activate grammars such as information dependent grammars. This option can open the possibility of speech-enabling out of context, or more general links, by avoiding time consuming navigation procedures.

Figure 6:
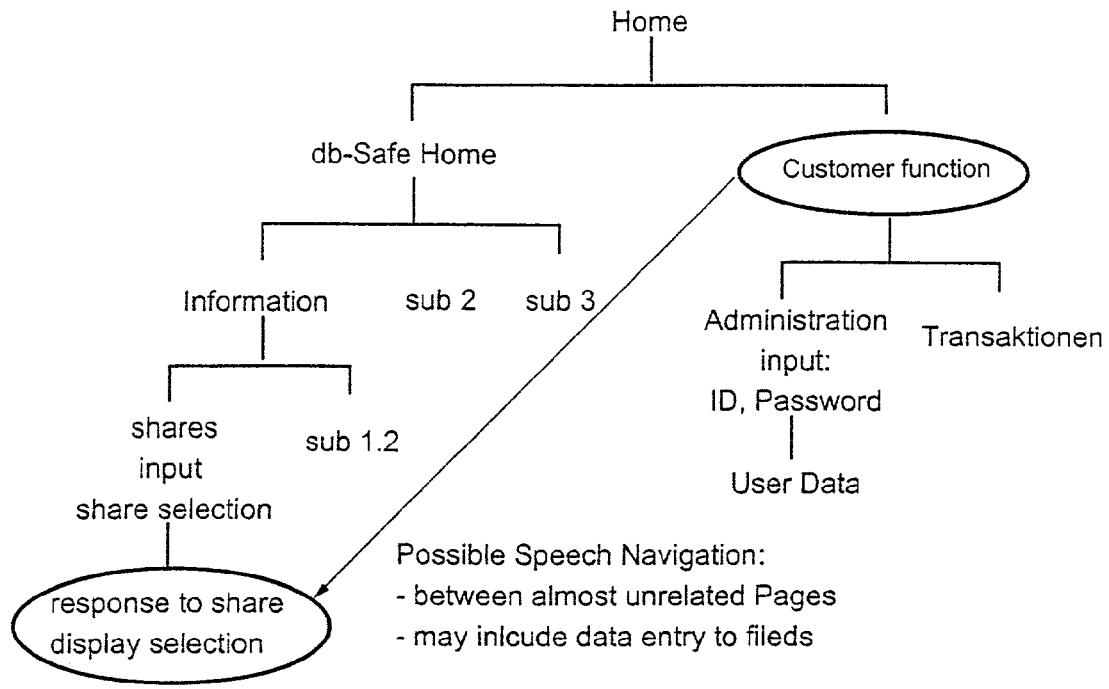
FIG. 6 is a schematic diagram illustrating an exemplary implementation of the invention disclosed herein.

FIG. 6 illustrates aspects of the present invention with respect to a stock brokerage application for buying stocks of a certain company via the Internet. Starting with the home page of the application, the user has to click down from the link "customer function" to the data entry field indicated by the arrow. Then the user must input the appropriate data in the data field by typing in information. Using the present invention, however, the user can voice-navigate directly from the link "customer function" to the desired data entry field. Also, the user can fill out the data entry field by voice without typing in any information. This can be accomplished through a grammar (applet) recognizing general navigation commands, help commands, additional submenu items, and the like, which can be included within the brokerage application.

Figure 7:
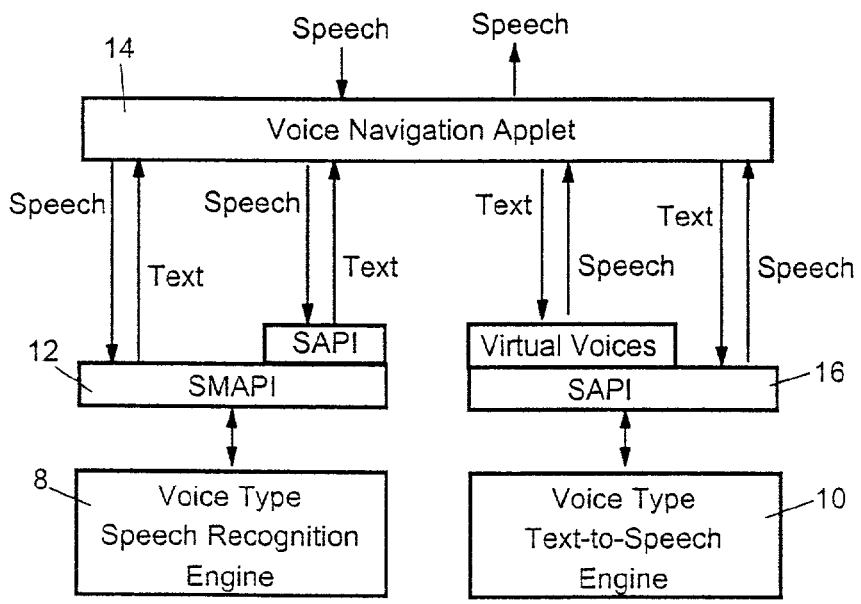
FIG. 7 is a schematic diagram illustrating an exemplary embodiment of the invention disclosed herein.

FIG. 7 illustrates the relationship of the interfaces by a specific implementation of the present invention into IBM's Via Voice Speech Recognition Engine (8) and Text-to-Speech Engine (10). The application programming interface to the IBM Via Voice Engine is SMAPI (12). It supports: verifying the API version, establishing a database session query system parameter, establishing a recognition session, setting up vocabularies, setting speech engine parameters, processing speech input, adding new words to the user vocabulary, handling errors, disconnecting from the speech engine, and closing a speech session. The SMAPI (8) is provided as a DLL which can be linked into the voice navigation component (applet) (14).

The application programming interface to the IBM Via Voice Text-to-Speech Engine (10) is called SAPI (16). The text-to-speech Engine uses the following resources to translate text into synthesized speech: user dictionaries, special words, abbreviations, and roots. The SAPI is provided as a DLL which can be linked into the voice navigation component (applet) (14). In the case where the voice navigation component (applet) is written in Java, an additional Java API can be layered between SMAPI (12), SAPI (16), and the voice navigation component (applet) (14). The Java API can also be provided as a DLL which can be linked into the voice navigation component (applet—not shown). More detailed information about the IBM ViaVoice programming interfaces can be accessed at <http://w3.speech.ibm.com/tkdoc/ViaVoice/proguide/pgmgui03.htm>.

What is claimed is:

1. A client system for gathering information via a network by voice input comprising:
   a speech recognition engine installed on said client system;
   a communication component installed on said client system configured to establish communications with a communication component on a server system which provides access to information stored on said server; and
   a voice navigation component configured to provide information-dependent grammars to said speech recognition engine via said communication component based on initial information loaded from said server to said client, said information-dependent grammars received in a directly-usable form from said server and configured to process results of said speech recognition system independently of said server.

2. The system according to claim 1, wherein said speech recognition engine further includes a speech synthesis engine.

3. The system according to claim 1, wherein said communication component on said client system and said voice navigation component form an integral component.

4. The system according to claim 1, wherein said communication component on said client system is a browser.

5. The system according to claim 1, wherein said voice navigation component is configured to locate, select, and initialize a speech recognition engine and a speech synthesis engine, and to enable and disable information-dependent grammars, and to process recognition results from said speech recognition engine.

6. The system according to claim 1, wherein said network is an Intranet or an Internet.

7. A client-server system comprising:
   a client having a speech recognition engine and a speech synthesis engine, a client communication component configured to establish communications with a server, and a voice navigation component configured to provide information-dependent grammars from said server to said speech recognition engine via said client communication component based on initial information loaded from said server to said client and further configured to process results of said speech recognition engine; and
   a server having a server communication component configured to establish communication with a client, a voice navigation component configured to provide information-dependent grammars to said speech recognition engine based on said initial information, wherein said information dependent grammars are received in a directly-usable form from said server and further configured to process said results of said speech recognition engine, wherein said voice navigation component is available for download to and execution on said client, and wherein said information-dependent grammars are available for download to and execution on said client for processing results of said speech recognition system independently of said server.

8. A method for gathering information via a network by voice input comprising:
   loading an initial information from a server in a client using a communication component;
   automatically loading an information-dependent grammar in said client by using access information contained in said initial information, said information-dependent grammar being received in directly-usable form from the server, and automatically providing said information-dependent grammar to a speech recognition engine disposed in said client for recognizing spoken words defined by said information-dependent grammar;
   sending results of said speech recognition engine to a voice navigation component; and
   processing results of said speech recognition engine in said voice navigation component independently of said server.

9. The method according to claim 8, wherein said information-dependent grammar defines possible input values of Web related Web pages, Web pages belonging to a Web application, or a related Web application.

10. The method according to claim 8, wherein said initial information is a Web page made available by said server.

11. The method according to claim 10, wherein said initial Web page contains a reference to said voice navigation component stored on said server.

12. The method according to claim 11, wherein each initial Web page contains a reference to a point-and-click component stored on said server.

13. The method according to claim 12, further comprising:
  automatically identifying reference information in said initial Web page for accessing said voice navigation component and said point-and-click component, and automatically loading said voice navigation component and said point-and-click component from said server to said client using said reference information.

14. The method according to claim 13, further comprising: automatically associating said identified reference information with information-dependent grammars in said initiating Web page;
  automatically loading said identified information-dependent grammar in said client; and
  providing said speech recognition engine with access to said information-dependent grammar via said voice navigation component.

15. The method according to claim 12, wherein said voice navigation component and said point-and-click component have a common user-interface including user selectable options.

16. The method according to claim 15, wherein said voice navigation component user interface includes options for selecting information-dependent grammars stored on said server.

17. The method according to claim 8, wherein said voice navigation component is configured to process a spoken response, a change of browser content, and an HTTP-request to load a new application, applet, or Web page.

18. The method according to claim 8, wherein said voice navigation component is configured to redraw a content frame, to retrieve information from a server, and to initiate a server-based transaction from said speech recognition and synthesis engine.

19. A machine-readable storage, having stored thereon a computer program having a plurality of code sections executable by a machine for causing the machine to perform the steps of:
  loading an initial information from a server in a client using a communication component;
  automatically loading an information-dependent grammar in said client by using access information contained in said initial information, said information-dependent grammar being received in a directly-usable form from the server, and automatically providing said information-dependent grammar to a speech recognition engine disposed in said client for recognizing spoken words defined by said information-dependent grammar;
  sending results of said speech recognition engine to a voice navigation component; and
  processing results of said speech recognition engine in said voice navigation component independently of said server.

20. The machine-readable storage according to claim 19, wherein said information-dependent grammar defines possible input values of Web related Web pages, Web pages belonging to a Web application, or related Web applications.

21. The machine-readable storage according to claim 19, wherein said initial information is a Web page made available by said server.

22. The machine-readable storage according to claim 21, wherein said initial Web page contains a reference to said voice navigation component stored on said server.

23. The machine-readable storage according to claim 22, wherein each initial Web page contains a reference to a point-and-click component stored on said server.

24. The machine-readable storage according to claim 23, further comprising:
  automatically identifying reference information in said initial Web page for accessing said voice navigation component and said point-and-click component and automatically loading said voice navigation component and said point-and-click component from said server to said client using said reference information.

25. The machine-readable storage according to claim 24, further comprising:
  automatically associating said identified reference information to information-dependent grammars in said initiating Web page;
  automatically loading said identified information-dependent grammar in said client; and
  providing said speech recognition engine with access to said information-dependent grammar via said voice navigation component.

26. The machine-readable storage according to claim 23, wherein said voice navigation component and said point-and-click component have a common user-interface including user selectable options.

27. The machine-readable storage according to claim 26, wherein said voice navigation component user interface includes options for selecting information-dependent grammars stored on said server.

28. The machine-readable storage according to claim 23, wherein said voice navigation component is configured to process a spoken response, a change of browser content, and an HTTP-request to load a new application, applet, or Web page.

29. The machine-readable storage according to claim 23, wherein said voice navigation component is configured to redraw a content frame, to retrieve information from a server, and to initiate a server-based transaction from said speech recognition and synthesis engine.

* * * * *